Figure 1:
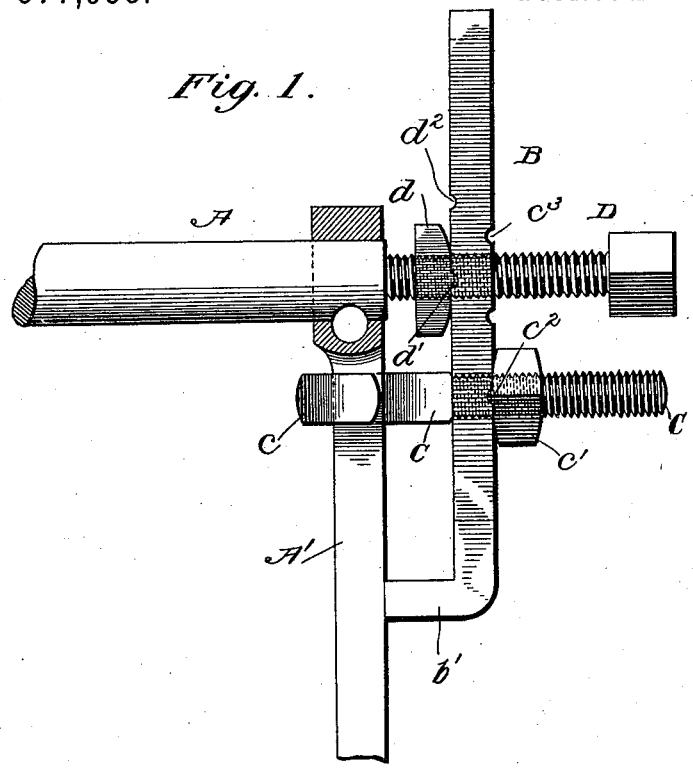

(No Model.)

I. B. HANNA.
DEVICE FOR REMOVING CRANKS FROM BICYCLE SHAFTS.

No 577,953. Patented Mar. 2, 1897.

Witnesses
Edw. D. Dunsell Jr.
J. A. E. Criswell

Inventor
Isaac B. Hanna
By Butterworth & Dowell
his Attorneys

UNITED STATES PATENT OFFICE.

ISAAC B. HANNA, OF KANKAKEE, ILLINOIS.

DEVICE FOR REMOVING CRANKS FROM BICYCLE-SHAFTS.

SPECIFICATION forming part of Letters Patent No. 577,953, dated March 2, 1897.

Application filed July 27, 1896. Serial No. 600,720. (No model.)

*To all whom it may concern:*

Be it known that I, ISAAC B. HANNA, a citizen of the United States, residing at Kankakee, in the county of Kankakee and State of Illinois, have invented certain new and useful Improvements in Devices for Removing Cranks from Bicycle-Shafts; and I do hereby declare the following to be a full, clear, and exact description of the invention, such as will enable others skilled in the art to which it appertains to make and use the same.

This invention relates to a device or devices for disconnecting one or more mechanical elements, but more particularly to disconnecting or removing the pedal-cranks of bicycles from the driving-shaft.

In the manufacture of bicycles and like vehicles it is necessary that the several parts be as light as possible consistent with strength and that they be properly fitted to each other in order to secure the ready adjustment and easy running of the machine and to prevent jar and unnecessary wear of the working parts. These requirements necessitate exact measurements and as near perfect fit of the parts as it is possible to secure, and for this reason it is difficult and in some instances impossible to remove one part of the machine from another without either straining or otherwise injuring one or more of the parts of the machine. Particularly is this the case with the pedal-crank and the driving-shaft, which, owing to rust and long use, often prevents their removal or disconnection without considerable expenditure of time and labor and in many cases results in greatly injuring the machine by jarring or otherwise straining the parts.

The primary object of my invention is to overcome these objectionable features and to provide a device or tool which may be readily applied to the crank of a bicycle or other vehicle, so that the crank may be readily and expeditiously forced or removed from its shaft while in the machine, in case repairs or other causes necessitate its removal, without heating the part to be disconnected or otherwise injuring the mechanism or other parts of the machine.

A further object is to provide a simple, inexpensive, effective, and durable device or tool which may be readily applied to the mechanism or other part of the machine to be removed and which may be adjusted to various requirements, so as to adapt the device to be applied to machines of different sizes.

The invention will be hereinafter more particularly described with reference to the accompanying drawings, forming a part of this specification, and then pointed out in the claims at the end of the description.

Figure 2:
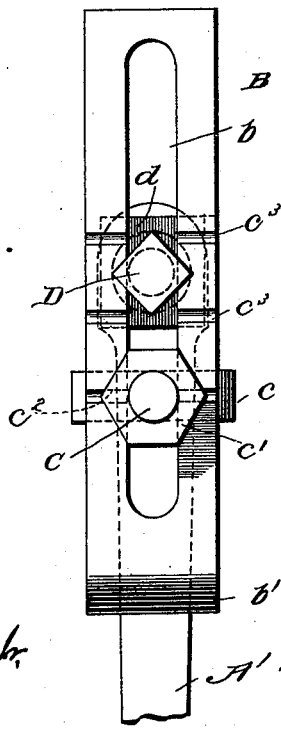

Referring to the drawings, Figure 1 is a side elevation of the tool or device, illustrating the same as applied to a crank and its shaft, both being removed from the machine; and Fig. 2 is a front elevation of the device.

In the drawings, A may designate the driving-shaft of a bicycle or other vehicle, and A' the crank to be disconnected therefrom. To effect this disconnection, I preferably provide a clamp or clamping-plate B, provided with a longitudinally-extending slot $b$ and a bent or angularly-formed end $b'$, adapted to abut against the outer surface of the crank A', so as to provide a suitable space between the inner surface of the clamping-plate and the crank.

The body portion of a draft-bolt or hook C passes through the slot $b$ of the clamping-plate and has one end bent or hooked, as at $c$, so as to engage the body portion of the crank or other device to be disconnected, and its other end screw-threaded and provided with a nut $c'$ in order to hold the clamping-plate in its proper relative position with respect to the crank and shaft and to form a back support for the plate. This nut is preferably rounded upon its inner surface and provided with a projection or teat $c^2$, adapted to engage transverse grooves or recesses $c^3$ in the outer surface of the clamping-plate, so as to secure various adjustments of the draft-bolt or hook and to permit a slight canting or rocking action of the clamping plate or bolt. A screw or bolt D has its body portion screw-threaded and passed through the slot $b$ of the clamping-plate, above the draft-bolt C, so that its inner end may abut against the inner surface of the shaft A. On the screw D is a nut $d$, interposed between the end of the shaft A and the inner surface of the clamping-plate, having a preferably rounded outer surface provided with a projection, teat, or teats $d'$, adapted to engage transverse grooves or recesses $d^2$ in the inner surface of the plate in order to provide various adjustments of the screw D and to prevent rotary motion of the nut, so that by turning the screw with a wrench or otherwise the shaft A and the crank and clamping-plate will be forced apart, so as to permit the crank to be disconnected.

The manner of using and constructing the invention will be readily understood from the foregoing description when taken in connection with the accompanying drawings. Assuming the parts to be in the position shown, it will be seen that the crank and the clamping-plate will be held in their proper relative positions with respect to each other by the draft-bolt or hook C. If the screw or bolt D be now rotated, by a wrench or otherwise, the action of the bolt upon the nut will tend to separate the shaft and crank and the clamping-plate, but as the draft-bolt holds the crank and clamping-plate together the force exerted by the end of the screw upon the shaft will force the shaft in the direction of its rotation and the crank and clamping-plate in the opposite direction, so that by continuing the rotary motion of the screw the crank will be sufficiently released to permit its removal.

I thus provide simple and effective means for expeditiously removing the cranks of bicycles and like vehicles from their shaft without disconnecting, straining, or otherwise injuring the parts of the machine, and which may be adjusted to adapt the device for use in various connections and with various sizes of machines.

It is obvious that the form of the draft-bolt, the form of the clamp or clamping-plate, as well as the manner of holding and adjusting the nuts, may be changed, and that the device may be employed in disconnecting the same or other parts of different or similar machines, without departing from the spirit of my invention.

Having thus fully described my invention, what I claim as new, and desire to secure by Letters Patent of the United States, is—

1. A device of the character described, comprising a clamping-plate, a draft-bolt adapted to engage a portion of the mechanism, and a screw or bolt passing through a portion of the clamping-plate and adapted to engage the part to be disconnected, whereby one element may be readily removed from another without injury, substantially as described.

2. A disconnecting tool or device, comprising a clamping-plate having a bent or angularly-formed end adapted to abut against the surface of a bicycle-crank, a draft-bolt having a screw-threaded body portion passing through the clamping-plate, a nut arranged on said draft-bolt adapted to hold the crank and clamping-plate in their proper relative positions, a screw or bolt passing through a portion of the clamping-plate, adapted to abut against the crank or driving-shaft, and a nut arranged on the screw and engaging the clamping-plate so as to prevent its rotation, whereby the crank may be readily disconnected from its shaft without injury to the machine or any of its parts, substantially as described.

3. In a tool of the character described, the combination with a clamping-plate having a longitudinally-extending slot and provided with a bent or angularly-formed end adapted to abut against the surface of a bicycle-crank, a draft-bolt having a screw-threaded body portion passing through the slot in the clamping-plate, a nut arranged on said draft-bolt adapted to hold the crank and clamping-plate in their proper relative positions, a screw or bolt passing through the slot of the clamping-plate adapted to abut against the end of the driving-shaft, a nut arranged on the screw and engaging the clamping-plate so as to prevent its rotation, together with means for adjusting the draft-bolt and the screw, whereby various adjustments may be secured and the crank readily disconnected from its shaft without injury to any part of the machine, substantially as described.

4. A disconnecting tool or device, comprising a clamping-plate having a longitudinally-extending slot and provided with a bent or angularly-formed end adapted to abut against the surface of a bicycle-crank, a draft-bolt having a screw-threaded body portion passing through the slot in the clamping-plate, a nut arranged on said draft-bolt and provided with a projection or teats adapted to engage transverse grooves or recesses in the outer surface of the clamping-plate, a screw or bolt passing through the slot of the clamping-plate adapted to abut against the end of the driving-shaft, and a nut arranged on the screw and provided with projections or teats adapted to engage transverse grooves in the inner surface of the clamping-plate, whereby various adjustments may be secured and the crank readily disconnected from its shaft without injury to any part of the machine, substantially as described.

In testimony whereof I affix my signature in presence of two witnesses.

ISAAC B. HANNA.

Witnesses:
ALTA M. GOODWIN,
A. IRENE BLACKWELL.